Figure 1:
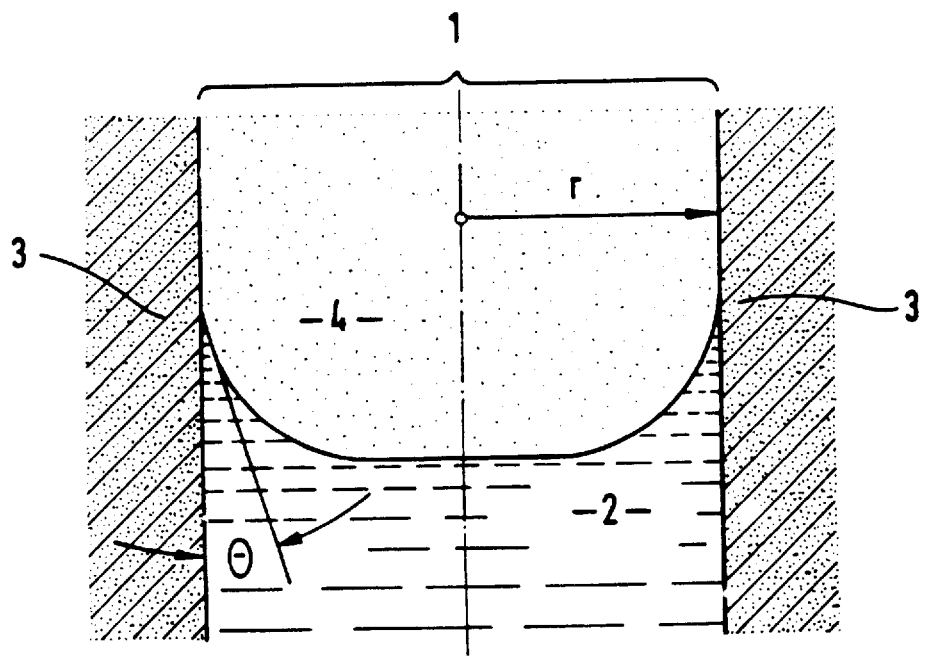

United States Patent

Frank et al.

[11] Patent Number: 5,866,027
[45] Date of Patent: Feb. 2, 1999

[54] PROCESS FOR PRODUCING FIBER-REINFORCED XEROGELS AND THEIR USE

[75] Inventors: Dierk Frank, Hofheim; Birgit Kessler, Frankfurt; Andreas Zimmermann, Grieshiem, all of Germany

[73] Assignee: Hoechst Aktiengesellschaft, Frankfurt, Germany

[21] Appl. No.: 793,543
[22] PCT Filed: Aug. 17, 1995
[86] PCT No.: PCT/EP95/03275
§ 371 Date: Feb. 21, 1997
§ 102(e) Date: Feb. 21, 1997
[87] PCT Pub. No.: WO96/06809
PCT Pub. Date: Mar. 7, 1996

[30] Foreign Application Priority Data

Aug. 29, 1994 [DE] Germany .................. 44 30 669.5

[51] Int. Cl.$^6$ .................................................. F04B 1/74
[52] U.S. Cl. .................. 252/62; 252/315.2; 428/920; 501/12
[58] Field of Search .................. 428/920; 252/315.1, 252/315.2, 62; 501/12

[56] References Cited

U.S. PATENT DOCUMENTS 5,306,555  4/1994  Ramamurthi et al. .

FOREIGN PATENT DOCUMENTS 3346180     8/1985  Germany .
WO 93/06044 4/1993  WIPO .

OTHER PUBLICATIONS

6001 Chemical Abstracts, 119 (1993) Jul. 26, No. 4, Columbus, Ohio, U.S.

Primary Examiner—James J. Bell
Attorney, Agent, or Firm—Frommer Lawrence & Haug LLP

[57] ABSTRACT

The invention relates to a process for producing modified, fiber-reinforced xerogels having porosities greater than 60% and xerogel matrix densities below 0.6 g/cm$^3$ and to their use as thermal insulating material.

12 Claims, 1 Drawing Sheet

PROCESS FOR PRODUCING FIBER-REINFORCED XEROGELS AND THEIR USE

This application is a §371 of PCT/EP95/03275, filed Aug. 17, 1995, based on Fed. Rep. Germany Application No. P 44 30 669.5, filed Aug. 29, 1994.

The invention relates to a process for producing modified, fiber-reinforced xerogels having porosities greater than 60% and densities below 0.6 g/cm³, hereinafter termed "fiber-reinforced xerogels", and to their use.

Xerogels having porosities above 60% and densities below 0.6 g/cm³, like supercritically dried aerogels, have very low thermal conductivity because of their very low density and high porosity. However, the high porosity also leads to low mechanical stability not only of the gel from which the xerogel is obtained by drying but also of the xerogel itself.

Aerogels in the wider sense, i.e. in the sense of "gel with air as dispersion medium", are formed by drying a suitable gel. The term "aerogel" in this sense encompasses aerogels in the narrower sense, xerogels and cryogels. A dried gel is an aerogel in the narrower sense when the liquid of the gel is substantially removed at temperatures above the critical temperature and starting from pressures above the critical pressure. If, by contrast, the liquid of the gel is removed suberitically, for example through formation of a liquid-vapor boundary phase, the resulting gel is termed a xerogel.

On drying conventional gels, capillary forces give rise to very high stresses which, in conjunction with the low stability of the highly porous gel structure, lead to collapse in the course of drying. The capillary pressure $P_c$ which arises during the drying process is determined by the surface tension $Y_{LV}$ of the surface between pore liquid 2 and its vapor 4, the contact angle $\theta$ between liquid meniscus and pore wall 3 and the radius r of pore 1 (FIG. 1):

$$P_c = -\frac{2Y_{LV}\cos\theta}{r}$$

The collapse can be avoided if the gel is dried supercritically, as described for example in EP-A-0382310, EP-A-0018955 and U.S. Pat. No. 4,610,863, and hence the surface tension $Y_{LV}$ is reduced to zero. However, the aerogels thus produced are mechanically not very stable.

However, the mechanical stability can be improved by fiber-reinforcing the aerogel as described in WO93/06044. However, the production process described in WO93/06044 is technically very difficult because of the need for supercritical drying. It involves drying a gel from an alcohol, for example methanol, at temperatures of 250° to 260° C. and pressures between 9.7 and 15.9 MPa.

DE-A-43 42 548 and WO 94/25149 describe processes for producing xerogels having densities below 0.3 g/cm³ and porosities above 60% where there is no need for supercritical drying of gels. The gels are modified by treatment of the internal surface area, for example by silylation in the case of $SiO_2$ xerogels, in such a way that they can be air dried without collapsing. The thus-produced xerogels are likewise mechanically not very stable and break easily.

It is an object of the present invention to provide a process for producing mechanically stable xerogels having porosities above 60% and xerogel matrix densities below 0.6 g/cm³ whereby the above-described disadvantages are avoided.

It has now been found that mechanically stable xerogels can be produced if, before or during the formation of the gel, fibers are incorporated into the sol in suitable form and amount, the pore surface of the the gel produced from the sol is modified in suitable form, and the gel is then dried under subcritical conditions. The products obtained are hereinafter termed "fiber-reinforced xerogels".

The invention accordingly provides a process for producing fiber-reinforced xerogels having porosities greater than 60% by volume and xerogel matrix densities less than 0.6 g/cm³, which comprises a) preparing a sol, b) adding fibers to the sol, c) converting the sol obtained in b) into a gel, d) optionally exchanging the liquid present in the gel, e) reacting the gel with one or more surface-modifying substances in such a way that a sufficiently large proportion of the surface groups of the gel is replaced by groups of the surface-modifying substance as to substantially suppress any further condensation between the surface groups on different pore surfaces and/or reduce the capillary forces by changing the contact angle between pore surface and the liquid from which the drying takes place, f) optionally exchanging the liquid present in the gel, and g) drying the resulting gel at a temperature below the critical temperature of the liquid present in the gel and a pressure of 0.001 bar to the vapor pressure of this liquid at this temperature.

The starting materials used are silicon and aluminum compounds suitable for the sol-gel technique (C. J. Brinker, G. W. Scherer, Sol-Gel Science, 1990, chapters 2 and 3) such as for example silicon alkoxides, aluminum alkoxides or waterglass, and those based on organic substances such as, for example, melamine-formaldehyde condensates (U.S. Pat. No. 5,086,085) or resorcinol-formaldehyde condensates (U.S. Pat. No. 4,873,218). They can be based on mixtures of the abovementioned materials. The sol can further consist of particulate or colloidal silicon oxide or aluminum oxide. Preference is given to using silicon compounds, especially waterglass.

The sol particles carry functional groups on the surface which are capable of condensation. These groups will be known as surface groups hereinafter. Typically, sol particles composed of silicon or aluminum compounds carry hydrophilic hydroxyl groups (OH). If alkoxides are used as starting material, some alkoxy groups (OR) can be left over as well from the production process (C. J. Brinker, G. W. Scherer, Sol-Gel Science, 1990, chapter 10).

The fibers added to the sol can be individual fibers, fiber mats or fiber webs. The addition of the fibers, especially in the case of individual fibers, can also take place during gel formation, when the gel has already attained a high viscosity but is not yet solid.

The conversion of the sol into a gel can be effected for example by hydrolysis and condensation of silicon or aluminum alkoxides, gelling of particulate or colloidal silicon or aluminum oxide or a combination of these methods. The preparation of silicon-containing gels is described for example in WO93/06044.

It is advantageous to allow the gel obtained in step c) or d) to age before the surface modification in order to increase the gel firmness. The aging of the gel generally takes place at a temperature of 20° C. to the boiling point of the liquid present in the gel. If, for example, the gel liquid is water, then the aging process generally takes place at 20° to 90° C., preferably 20° to 70° C., at a pH of 6 to 11, preferably 6 to 9, in the course of 1 minute to 48 hours, in particular 15 minutes to 24 hours.

If, in step a), an aqueous sol was used and the pH was adjusted with a mineral acid, the gel should be washed with water until electrolyte-free. The liquid present in the gel can be exchanged for the same or another liquid in a washing process (step d). If the gel contains water, for example, it is advisable to wash the gel with a protic or aprotic organic solvent until the water content of the gel is $\leq 5\%$ by weight, preferably $\leq 2\%$ by weight.

The organic solvents used are generally aliphatic alcohols, ethers, esters or ketones and also aliphatic or aromatic hydrocarbons. Preferred solvents are methanol, ethanol, acetone, tetrahydrofuran, ethyl acetate, dioxane, n-hexane, n-heptane and toluene. It is also possible to use mixtures of the aforementioned solvents. The solvent has to be substantially inert with respect to the surface-modifying substance used in step e).

Steps a) to d) are generally carried out at a temperature between the freezing point of the liquid present in the gel and 70° C., but not more than the boiling point of the liquid present in the gel.

The surface-modifying substances used in step e) convert a large proportion of the hydrophilic or reactive surface groups on the pore surfaces into hydrophobic surface groups or surface groups which are unsuitable for further condensation.

As a consequence, further condensation between groups on different pore surfaces is suppressed and the capillary forces are reduced through a change in the contact angle between pore wall and the meniscus of the liquid from which the drying takes place.

The original surface groups present are generally groups of the formula MOH or MOR where M is Al or Si and R is $C_1$–$C_6$-alkyl, preferably methyl or ethyl. Reaction with surface-modifying substances of the general formula $R'_n MX_m$ replaces the original surface groups with inert groups of the type $MR'_n$. Here n and m are integers greater than zero whose sum corresponds to the valence of M. R' is hydrogen or a nonreactive organic linear, branched, cyclic, aromatic or heteroaromatic radical such as, for example, $C_1$–$C_{18}$-alkyl, preferably $C_1$–$C_6$-alkyl, particularly preferably methyl or ethyl, cyclohexyl or phenyl; each R' is independently identical to or different from the others and can be bridged. Furthermore, X is halogen, preferably Cl, or a radical —OR", —SR" or —NR"$_2$, where R" is a straight-chain or branched, identically or differently mono- or polysubstituted aliphatic radical $C_1$ to $C_{18}$ in which one or more $CH_2$ groups can be replaced by —C≡C—, —CH=CH—, —COO—, —O(C=O)—, —SiR'"$_2$—, —CO—, phenylenediyl and/or up to every $CH_2$ unit can be replaced by O or NR'", where R'" is phenyl, $C_1$–$C_{18}$-alkyl or benzyl, or R" is a benzyl radical or phenyl radical which can be substituted by 1 to 5 substituents R', OH, OR', COOR', OCOR', $SO_3H$, $SO_2Cl$, F, Cl, Br, $NO_2$ or CN; and in the case of N, each R" is independently identical to or different from the others. If m is at least two, each X is independently identical to or different from the others or bridged. It is also possible to use mixtures of the surface-modifying substances.

Preference is given to using silylating agents of the formula $R'_{4-n}SiCl_n$ or $R'_{4-n}Si(OR')_n$ where n is 1 to 3 and R' is as defined above. Silazanes are also suitable. Preference is given to using methyltrichlorosilane, dimethyldichlorosilane, trimethylchlorosilane, trimethylmethoxysilane or hexamethyldisilazane.

The reaction is generally carried out at 20° to 100° C., preferably at 30° to 70° C., but at not more than the boiling temperature of the liquid present in the gel.

The silylated gel is preferably washed in step f) with a protic or aprotic solvent until the unconverted surface-modifying substance is essentially removed (residual level $\leq 1\%$ by weight). Suitable solvents are those mentioned for step d). Similarly, the solvents mentioned there as prefered are also prefered here.

In step g), the fiber-reinforced, surface-modified gel is dried at temperatures of −30° to 200° C., preferably 0° to 100° C., and a pressure of 0.001 to 20 bar, preferably 0.01 to 5 bar, particularly preferably 0.1 to 2 bar. Higher temperatures than 200° C. and/or higher pressures than 20 bar are readily possible, but they are associated with unnecessary effort and do not afford any advantages.

The advantage of the process of this invention is that the drying temperatures and pressures are far below the critical temperatures and/or pressures of the customary solvents. The drying is generally carried on until the gel has a residual solvent content of less than 0.1% by weight.

Examples of suitable drying processes are contact drying and convection drying.

In addition, the drying of the gel can be significantly speeded up by using dielectric drying processes, for example microwave drying. For this, following the surface modification, the solvent is if necessary exchanged in step f) for a solvent which is an efficient absorber of microwaves, such as, for example, water, ethanol or preferably acetone. The gels can then be rapidly dried in a microwave dryer.

The process of this invention is preferably used for producing fiber-reinforced $SiO_2$ xerogels having porosities greater than 60% by volume and xerogel matrix densities less than 0.6 g/cm$^3$, which comprises a) adjusting an aqueous waterglass solution ($SiO_2$ concentration $\leq 10\%$ by weight, preferably $\leq 7\%$ by weight) to a pH $\leq 3$, for example with the aid of an acidic ion exchange resin or a mineral acid, and adding a base, generally $NH_4OH$, NaOH, KOH, $Al(OH)_3$ and/or colloidal silica, to the resulting silicic acid, b) adding fibers, c) allowing the silicic acid to polycondense, d) washing the fiber-reinforced gel obtained in step c) with an organic solvent until the water content of the gel is $\leq 5\%$ by weight, e) reacting the gel obtained in step d) with a silylating agent, f) optionally washing the silylated gel with an organic solvent until the residual level of unconverted silylating agent is $\leq 1\%$ by weight, and g) drying the silylated gel obtained in step e) or f) at −30° to 200° C. and 0.001 to 20 bar.

Step a) is preferably carried out using an acidic ion exchange resin.

The fiber material used can be inorganic fibers, such as glass fibers or mineral fibers, organic fibers, such as polyester fibers, aramide fibers, nylon fibers or fibers of vegetable origin, and also blends thereof. The fibers can also be coated, for example polyester fibers metallized with a metal such as aluminum.

To improve the dispersibility of the fibers or the wetting of the web, the fibers can be coated with a suitable size. The coating can also serve to improve the bonding of the gel to the fibers.

The fire class of the fiber-reinforced xerogel is determined by the fire class of the xerogel matrix and that of the fiber material. To obtain an optimum fire class (low-flammable or incombustible) for the fiber-reinforced xerogel, the fibers should consist of noncombustible material, for example mineral or glass fibers, or of low-flammability materials such as melamine resin. It is further possible to eliminate organic constituents of the xerogel matrix by thermal treatment without significantly altering the structure and hence the thermal conductivity of the xerogel.

To obtain the lowest possible thermal conductivity for the fiber-reinforced xerogel, a) the volume proportion of fiber should be 0.1 to 30%, preferably 0.1 to 10%, and b) the thermal conductivity of the fiber material should be as low as possible, preferably <1 W/mK. Suitable choice of fiber diameter and/or material makes it possible to reduce the radiative contribution to the thermal conductivity and obtain great mechanical strength. For this the fiber diameter shall be a) preferably 0.1 to 30 $\mu$m in the case of unmetallized fibers and/or b) preferably 0.1 to 20 $\mu$m in the case of metallized fibers.

The radiative contribution to thermal conductivity can be further reduced by using IR-opacified fibers, for example PET fibers blackened with carbon black.

The radiative contribution to thermal conductivity can be further reduced if an IR opacifier, for example carbon black, titanium dioxide, iron oxide or zirconium dioxide, is added to the sol prior to production of the gel.

The mechanical strength is further influenced by length and distribution of the fibers in the xerogel.

The fibers can be incorporated for example as individual fibers randomly or ordered.

It is similarly possible to use webs or mats, in which case a plurality of webs or mats can be superposed, too. In the case of the layered arrangement of mats with a preferred direction, a change in the preferred direction from one layer to the next is advantageous. The use of webs or mats has the advantage that a strong bending stress will be able to produce cracks in the xerogel matrix, but the xerogel matrix will not break owing to the web. From the point of view of solvent exchange and drying it is particularly advantageous to have fiber-reinforced gel sheets having a thickness of between 0.5 and 5 mm, since the solvent exchange time or the drying time is essentially determined by the diffusion of the solvent or solvent vapor.

The resulting fiber-reinforced xerogels are hydrophobic when the surface groups applied by the surface modification are hydrophobic, as is the case when using trimethylchlorosilane, for example. The hydrophobicity can subsequently be reduced for example by thermal expulsion or partial pyrolysis.

Thicker sheets of fiber-reinforced xerogels can be obtained by joining thin sheets together, for example by incorporation into a suitable sleeve, by adhesion or by suitable mechanical bonding such as clipping or sewing. The surface of the fiber-reinforced xerogel can be laminated with materials known to the person skilled in the art, for example plastic films, paper, paperboard, webs or wovens.

The fiber-reinforced xerogels obtained by the process of this invention have low thermal conductivity making them suitable for use as thermal insulating materials. When suitable light-transmitting fibers are used, for example glass fibers, the xerogel obtained will be light-transmitting, transparent and suitable for use as transparent thermal insulation. The choice of the fiber material used can be used to vary the bending stiffness of the sheets. Choice of suitable fiber material and suitable fiber distribution can be used to achieve decorative effects as well as an insulating effect.

In addition, they can be used as sound absorption materials directly or in the form of resonance absorbers, since they have a low sound velocity and a high sound damping capacity for solid materials.

SHORT DESCRIPTION OF THE DRAWING

FIG. 1 shows a schematic representation of a pore 1 approximately half filled with pore liquid 2 and vapor 4, the contact angle θ between liquid meniscus and pore wall 3, and the radius r of the pore.

EXAMPLE 1

Tetraethyl orthosilicate (TEOS) was used to produce different fiber-reinforced xerogels by the following process:

100 ml of TEOS, 100 ml of ethanol, 7.98 ml of distilled water and 0.33 ml of 1M HCl were added together and refluxed for 1.5 to 2 hours.

10 parts of the sol were admixed with one part of 0.5M $NH_4OH$ solution and poured into petri dishes over rockwool fibers present therein. The rockwool was cut from a commercial insulating mat. The amount was sufficient to just cover the fibers. The gel time was about 20 minutes. The samples were kept tightly sealed during that period. The ageing of the gel was brought about by heating at 50° C. for 24 hours.

The aged gel cooled down to room temperature was introduced into ethanol and then heated to 50° C. for 1 hour. This process was repeated twice with fresh ethanol and then once with n-hexane. Thereafter the n-hexane was exchanged three times, and the sample was stored at 50° C. for a further 24 hours.

The moist gel was then admixed with 10% by weight of trimethylchlorosilane (TMCS) and stored at 50° C. for 24 hours. Thereafter the TMCS residues were washed out twice with n-hexane at 50° C. for 1 hour each time.

The drying was then carried out in three stages at 37° C., 50° C. and 140° C. for 24 hours each time.

Table 1 shows the results of the experiments. The thermal conductivity was measured with a hot wire method (O. Nielsson, G. Rüschenpöhler, J. Groβ, J. Fricke, High Temperatures-High Pressures, 21 (1989), 267–274), and the modulus and the breaking stress were measured with a three-point bending method (for example G. W. Scherer, S. A. Pardenek, R. M. Swiatek, J. Non-Crystalline Solids, The fiber-reinforced xerogel did not break at a certain tension during the three point-bending test, but only deformed irreversibly at high loads.

EXAMPLE 2

The experiments were carried out as in Example 1 except that the fiber material used was Hoechst aramide (HMA) short cut 2 mm in length. The results are summarized in Table 1.

The fiber-reinforced xerogel did not break at a certain tension during the three-point bending test, but only deformed irreversibly at high loads.

EXAMPLE 3

The experiments were carried out as in Example 1 except that the fiber material used was a polyester (PET) web composed of 50% each of 0.9 dtex and 1.7 dtex Trevira® 290, having a density of 15 kg/m³ and needled with 150 stitches/cm². The results are summarized in Table 1. The fiber-reinforced xerogel did not break at a certain tension during the three-point bending test, but only deformed irreversibly at high loads.

EXAMPLE 4

The experiments were carried out as in Example 1 except that the fiber material used was a TREVIRA SPUNBOND® polyester web having a basis weight of 70 kg/m$^3$. The results are summarized in Table 1. The fiber-reinforced xerogel did not break at a certain tension during the three-point bending test, but only deformed irreversibly at high loads.

EXAMPLE 5

The experiments were carried out as in Example 1 except that glass fibers were used. The results are summarized in Table 1.

The fiber-reinforced xerogel did not break at a certain tension during the three-point bending test, but only deformed irreversibly at high loads.

EXAMPLE 6

1 l of a sodium waterglass solution (containing 8% by weight of SiO$_2$ and an Na$_2$O:SiO$_2$ weight ratio of 1:3.3) was stirred together with 0.5 l of an acidic ion exchange resin (styrene-divinylbenzene copolymer with sulfonic acid groups, commercially available under the name Duolite® C20) until the aqueous solution had reached a pH of 2.7. The ion exchange resin was then filtered off and the aqueous solution was adjusted to a pH of 4.8 with 0.5M NH$_4$OH solution.

A polyester web composed of 50% each of 0.9 dtex and 1.7 dtex TREVIRA® 290, having a density of 15 kg/m$^3$ and needled with 150 stitches/cm$^2$ was then introduced into the gellable solution. The proportion of the web is 5% by volume, based on the gel.

Thereafter the resulting gel was aged at 50° C. for 24 hours. The water present in the gel was initially extracted with 3 l of ethanol. Thereafter the ethanol was exchanged for 3 l of n-heptane. The hexane-containing gel was silylated with trimethylchlorosilane (TMCS) using 0.05 g of TMCS per gram of wet gel, and then washed again with 0.5 l of n-hexane. The drying of the gel took place in air (3 hours at 40° C., then 2 hours at 50° C. and 12 hours at 150° C.).

The fiber-reinforced xerogel did not break at a certain tension during the three-point bending test, but only deformed irreversibly at high loads. The modulus of elasticity was 2 MPa.

EXAMPLE 7

The experiment was carried out as in Example 6 except that glass fibers were used. The fiber-reinforced xerogel did not break at a certain tension during the three-point bending tert, but only deformed irreversibly at high loads. The modulus of elasticity was 10 MPa.

EXAMPLES 8 to 11

Gels were prepared as in Examples 1 to 4. Before drying, a solvent exchange was carried out with ethanol. The samples were then dried using microwaves at a power of 50 W in an oven from El-A, Munich. Volume shrinkage did not occur. Table 2 shows the drying times required.

TABLE 1

Experimental results for thermal conductivity and modulus of fiber-reinforced TEOS xerogels

| Ex. | Fiber material | Volume proportion of fiber [%] | Density [kg/m$^3$] | Thermal conductivity [mW/mK] | Modulus of elasticity [MPa] | Breaking stress [MPa] |
|---|---|---|---|---|---|---|
| 1 | Rockwool | 5 | 157 | 23 | 4 | x |
| 2 | HMA short cut, 2 mm | 5 | 184 | 21 | 2 | x |
| 3 | PET web, 150 stitches/cm$^2$, 15 kg/m$^3$ | 1.4 | 200 | 20 | 2 | x |
| 4 | PET Trevira spunbond, 70 kg/m$^3$ | 5 | 250 | 33 | 20 | x |
| 5 | Glass fibers | 2 | 180 | 18 | 8 | x | x = Only irreversible deformation occurred with cracking, but no break

TABLE 2

Experimental results for the drying of TEOS xerogels with microwaves from ethanol at 50 W power

| Ex. | Fiber material | Thickness of sample [mm] | Drying time [min] | Density [kg/m$^3$] | Residual Volume content [%] | shrinkage [%] |
|---|---|---|---|---|---|---|
| 8 | Rockwool | 6 | 110 | 160 | 0.82 | 0 |
| 9 | HMA short cut, 2 mm | 7 | 55 | 181 | 0.00 | 0 |
| 10 | PET web, 100 stitches/cm$^2$, 19 kg/m$^3$ | 3 | 40 | 203 | 1.06 | 0 |
| 11 | PET Trevira spunbond, 70 kg/m$^3$ | 3 | 30 | 177 | 0.00 | 0 |

EXAMPLE 12

A gel was prepared as in Example 3. Before drying, a solvent exchange was carried out with ethanol. The drying was effected with a hot nitrogen stream at 80° C. for a drying time of 60 minutes. The following data were obtained for the dried fiber-reinforced xerogel:

Thickness of sample: 3 mm

Density: 170 kg/m$^3$

Residual moisture content: 1.6%

Volume shrinkage: 2%

EXAMPLE 13

Waterglass was used as the basis for the production of xerogel sheets by the following process: A glass fiber web having a basis weight of 300 g/m$^2$ and a thickness of 3 mm (PolyMat-Glasnadelmatte Typ G300 from Schuller, Wertheim) was calcined at 500° C. for 1 hour. 1 l of a sodium waterglass solution (containing 8% by weight of $SiO_2$ and an $Na_2O:SiO_2$ weight ratio of 1:3.3) was stirred together with 0.5 of an acidic ion exchange resin (styrene-divinylbenzene copolymer with sulfonic acid groups, commercially available under the name ®Duolite C20) until the aqueous solution had reached a pH of 2.7. The ion exchange resin was then filtered off and the aqueous solution was adjusted to a pH of 4.8 with 1M NaOH solution.

The web was introduced into a mold and the sol was poured on top of it to cover all of the web. The mold was then tightly closed and stored at 85° C. for 5 hours in a drying cabinet.

The sheet was then washed with acetone until the water content was below 0.5% by weight. The moist gel was admixed with 10% by weight of trimethylchlorosilane (TMCS) and stored at room temperature for 24 hours. Thereafter it was washed a further six times with acetone.

Drying took place in two stages, 24 hours at 50° C. and 850 mbar pressure, then 12 hours at 140° C. and 50 mbar pressure.

The density of the composite material was 0.25 g/cm$^3$. Thermal conductivity was determined as in Example 1. The thermal conductivity value found was 17 mW/mK. The xerogel sheet did not break at a certain tension during the three-point bending test, but only deformed irreversibly at high loads.

What is claimed is:

1. A process for producing fiber-reinforced xerogels having porosities greater than 60% by volume and xerogel matrix densities less than 0.6 g/cm$^3$, which comprises
   a) preparing a sol,
   b) adding fibers to the sol,
   c) converting the sol obtained in b) into a gel having pores with hydrophilic or reactive groups on the surface thereof,
   d) optionally exchanging the liquid present in the gel,
   e) reacting the gel with one or more surface-modifying substances to convert a sufficiently large proportion of the hydrophilic or reactive surface groups on the pore surfaces into hydrophobic surface groups or surface groups which are unsuitable for further condensation as to substantially suppress any further condensation between the surface groups on different pore surfaces and/or reduce the capillary forces by changing the contact angle between pore surface and the liquid from which the drying takes place,
   f) optionally exchanging the liquid present in the gel, and
   g) drying the resulting gel at a temperature below the critical temperature of the liquid present in the gel and a pressure of 0.001 bar to the vapor pressure of this liquid at this temperature.

2. The process of claim 1, wherein the gel obtained in step c) or d) is aged at a temperature of 20° C. to the boiling point of the liquid present in the gel.

3. The process of claim 1, wherein the gel is reacted in step e) with at least one surface-modifying substance of the general formula $R'_n MX_m$, where R' is hydrogen or a nonreactive, organic, linear, branched, cyclic, aromatic or heteroaromatic radical, each R' being independently identical to or different fron the others, M is Al or Si, X is a halogen or a radical —OR", —SR" or —NR"$_2$, where R" is a straight-chain or branched, identically or differently mono- or polysubstituted aliphatic radical $C_1$ to $C_{18}$ in which one or more $CH_2$ groups can be replaced by —C≡C—, —CH=CH—, —COO—, —O(C=O)—, —SiR'''$_2$—, —CO—, phenylenediyl and/or up to every $CH_2$ unit can be replaced by O or NR''', where R''' is phenyl, $C_1$–$C_{18}$-alkyl or benzyl, or R" is a benzyl radical or phenyl radical which can be substituted by 1 to 5 substituents R', OH, OR', COOR', OCOR', $SO_3H$, $SO_2Cl$, F, Cl, Br, $NO_2$ or CN; and in the case of N each R" is independently identical to or different from the others, n and m are integers greater than zero whose sum corresponds to the valence of M, each X being independently identical to or different from the others for m≧2.

4. The process of claim 3 for producing fiber-reinforced $SiO_2$ xerogels, which comprises
   a) adjusting an aqueous waterglass solution to a pH ≦3 and adding a base to the resulting silicic acid,
   b) adding fibers,
   c) allowing the silicic acid to polycondense,
   d) washing the fiber-reinforced gel obtained in step c) with an organic solvent until the water content of the gel is ≦5% by weight,
   e) reacting the gel obtained in step d) with a silylating agent,
   f) optionally washing the silylated gel with an organic solvent until the residual level of unconverted silylating agent is ≦1% by weight, and
   g) drying the silylated gel obtained in step e) or f) at –30° to 200° C. and 0.001 to 20 bar.

5. The process of claim 1, wherein the drying of the gel in step g) is effected by means of a dielectric process.

6. The process of claim 5, wherein the gel is dried by microwaves.

7. The process of claim 1, wherein the volume proportion of fiber is 0.1 to 30%.

8. The process of claim 1, wherein the fiber diameter is
   a) 0.1 to 30 µm in the case of unmetallized fiber and/or
   b) 0.1 to 20 µm in the case of metallized fiber.

9. The process of claim 1, wherein an IR opacifier is added to the sol in step a) or b).

10. The process of claim 1, wherein the fibers are used in the form of webs or mats.

11. The process of claim 1, wherein individual fibers are used, in random or oriented form.

12. The use of the fiber-reinforced xerogels produced by the process of claim 1 as thermal insulating material and/or sound absorption material.

* * * * *